United States Patent

Beier et al.

(12) United States Patent
(10) Patent No.: US 9,493,101 B2
(45) Date of Patent: Nov. 15, 2016

(54) BEARING DEVICE

(75) Inventors: Rico Beier, Stadthagen (DE); Titus Falbesaner, Steinhude (DE); Bertrand Touzet, Pollhagen (DE)

(73) Assignee: Faurecia Autositze GmbH (DE)

( * ) Notice: Subject to any disclaimer, the term of this patent is extended or adjusted under 35 U.S.C. 154(b) by 116 days.

(21) Appl. No.: 14/001,689

(22) PCT Filed: Feb. 14, 2012

(86) PCT No.: PCT/EP2012/000637
§ 371 (c)(1),
(2), (4) Date: Jan. 31, 2014

(87) PCT Pub. No.: WO2012/116778
PCT Pub. Date: Sep. 7, 2012

(65) Prior Publication Data
US 2014/0209775 A1     Jul. 31, 2014

(30) Foreign Application Priority Data

Mar. 2, 2011 (DE) .................. 10 2011 012 819

(51) Int. Cl.
*B60N 2/68* (2006.01)
*B60N 2/08* (2006.01)

(52) U.S. Cl.
CPC . *B60N 2/68* (2013.01); *B60N 2/08* (2013.01); *B60N 2/0818* (2013.01); *B60N 2/682* (2013.01)

(58) Field of Classification Search
CPC ...... B60N 2/015; B60N 2/07; B60N 2/0705; B60N 2/0715; B60N 2/0732; B60N 2/08; B60N 2/0812; B60N 2/0818; B60N 2/0825; B60N 2/085; F16B 37/16; F16B 37/061; F16B 35/06; Y10T 403/56; Y10T 16/469; Y10T 16/4713; Y10T 16/37; Y10S 16/37; Y10S 16/24

USPC ....... 411/435, 171; 248/429, 424; 296/65.13
See application file for complete search history.

(56) References Cited

U.S. PATENT DOCUMENTS

D274,979 S * 8/1984 Hill .............................. D8/398
4,516,811 A   5/1985 Akiyama et al.
(Continued)

FOREIGN PATENT DOCUMENTS

DE        3828375     2/1990
DE     102008058518   5/2010

OTHER PUBLICATIONS

International Search Report and Written Opinion for PCT Application PCT/EP2012/000637, EPO Apr. 24, 2012.
(Continued)

*Primary Examiner* — Ingrid M Weinhold

(57) ABSTRACT

A bearing device for supporting a pivot lever that is pivotable around a pivot axis (A), in particular for adjusting seats in motor vehicles, having a receptacle (2) with at least two sections (2a, 2b) that are arranged at an angle to each other. The receptacle (2) has at least one recess (2c) as well as one inner side, which is defined between the inner side of the first section (2a) that faces away from the position of the pivot lever and the inner side of the second section (2b) that faces toward the inner side of the first section (2a). The bearing device includes additionally a holding element (1, 1') that is connected to the receptacle (2). The holding element (1, 1') is attached to the second section (2b) with at least one connecting surface (1b, 1b') that faces the inner side of the second section (2b).

11 Claims, 2 Drawing Sheets

(56) References Cited

U.S. PATENT DOCUMENTS

| | | | |
|---|---|---|---|
| 8,016,258 B1* | 9/2011 | Boyarski et al. | 248/576 |
| 2005/0242264 A1* | 11/2005 | John | 248/424 |
| 2007/0176072 A1* | 8/2007 | Ikegaya | B60N 2/0705 |
| | | | 248/429 |
| 2007/0212193 A1* | 9/2007 | Wang | 411/171 |
| 2013/0193296 A1* | 8/2013 | Hoshi et al. | 248/429 |

OTHER PUBLICATIONS

Translated International Preliminary Report on Patentability for PCT Application PCT/EP2012/000637, WIPO Sep. 12, 2013.

* cited by examiner

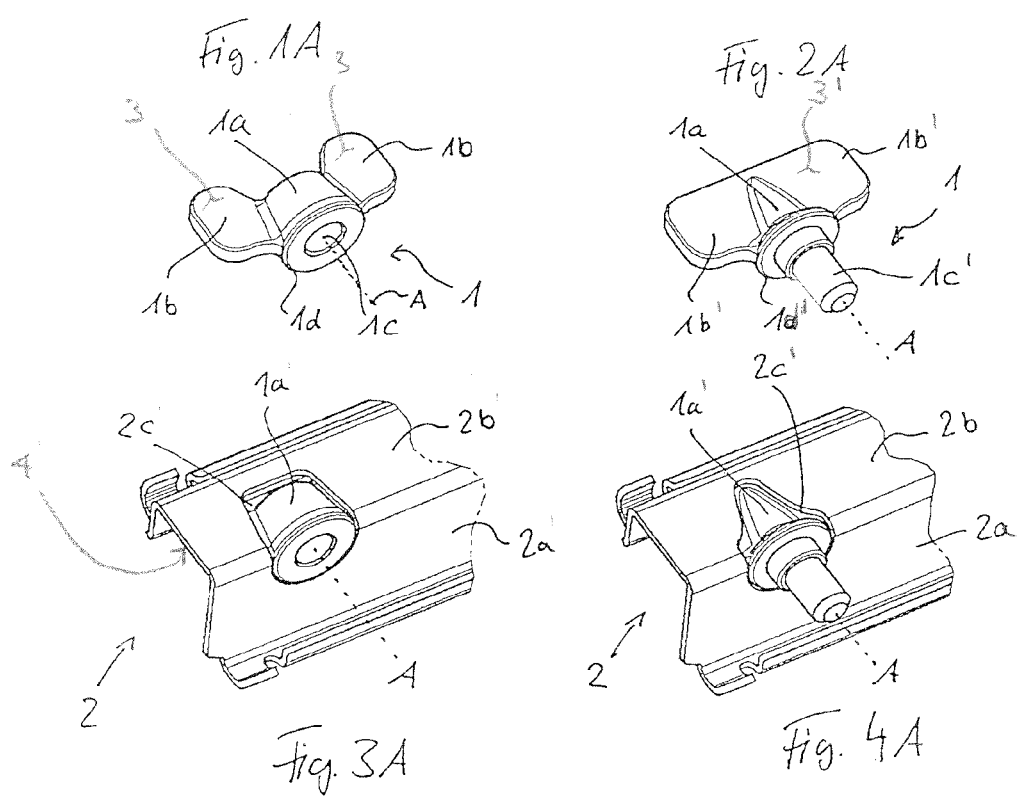

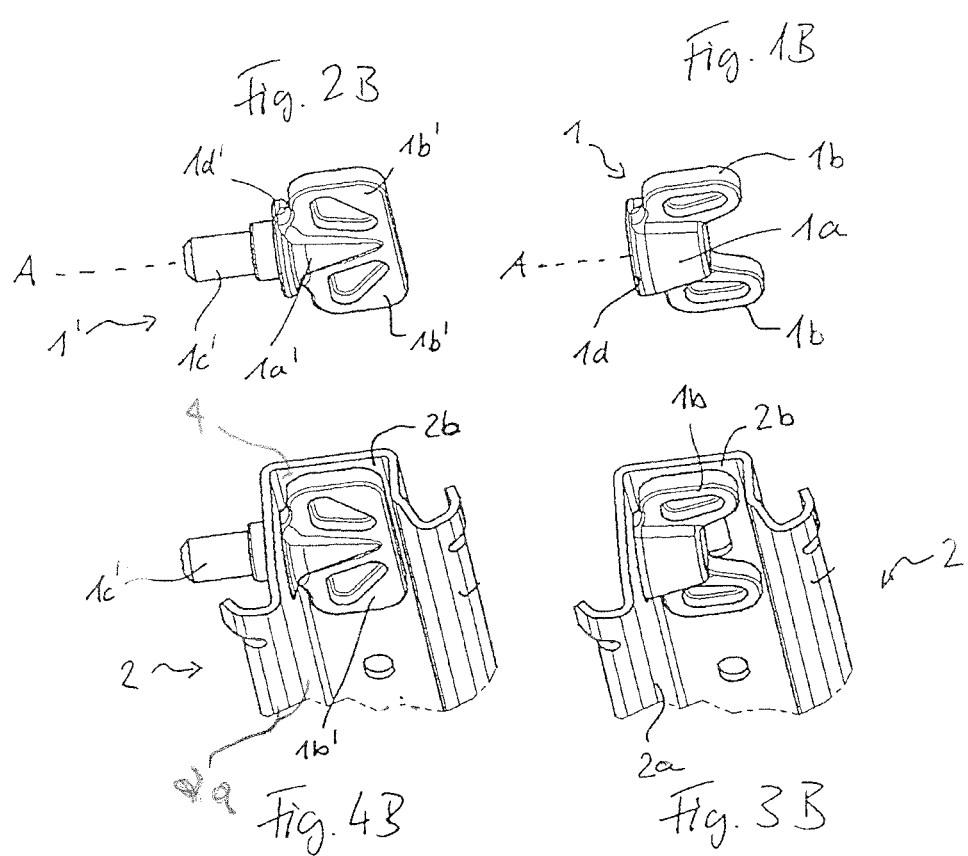

BEARING DEVICE

TECHNICAL FIELD

The invention relates to a bearing device for supporting a pivot lever.

BACKGROUND INFORMATION

Corresponding devices are used for mounting adjustment levers, in particular for seat adjustments such as longitudinal or height adjustments of seats in motor vehicles. Longitudinal adjustment rails are provided, which are designed to be moveable in relation to a stationary guide rail at the vehicle floor. To actuate the adjustment mechanism, a pivot lever that can be pivoted perpendicular to the driving direction around an axis is generally mounted at the longitudinal adjustment rails. To support the same, a bearing bolt must be provided at the adjustment rail. Since the adjustment rails are typically receptacles with a C-shaped profile cross-section, a conventional threaded bolt cannot be guided from the inside through a borehole provided for the same.

Known from U.S. Pat. No. 4,516,811 is to weld a nut with its face side to the adjustment rail in order to connect the adjustment rail with the seat cushion frame. This makes assembly with the seat cushion frame easier.

SUMMARY

The problem addressed by the present invention is to provide a bearing device to support a pivot lever that is pivotable around a pivot axis and requires little space and few components.

According to the invention, a holding element designed as a wing nut or a wing bolt is fastened to the inner side of a receptacle having at least two angled sections, said receptacle being preferably designed as a profiled rail or a longitudinally adjustable rail of a vehicle seat. Fastening is accomplished via a connecting surface, which is preferably a wing surface of the holding element designed as a wing nut or a wing bolt, where the connection between the holding element and the receptacle is provided at the inner side of the receptacle and can be established especially by welding or riveting. In particular the connecting surface can be provided to not be normal to the pivot axis of the pivot lever that is to be supported or to the pivot bolt that is to be arranged at the holding element. Simply expressed, the connection of the holding element and the receptacle for two elements is established on the inner side of the receptacle section that is at a greater distance to the pivot lever that is to be supported. Furthermore, a receptacle is provided that extends preferably across portions of both sections of the receptacle and through which in particular the bearing axis or the pivot axis of the pivot lever to be supported runs. The holding elements, regardless of whether designed as wing nuts or wing bolts, have uniformly shaped bearing sections such that the recess in the receptacle can be designed uniformly as well, requiring therefore only the provision of one type of receptacle, independent of whether the particular application requires a wing nut or a wing bolt or some other holding element.

Preferably a part, especially a bearing section that receives or has a bearing bolt, is placed or inserted into the receptacle, whereby additionally the holding element can rest with at least a portion of the bearing section on an edge section of the recess, thus providing an additional support area. Preferably, the shape of the recess corresponds to the shape of the bearing section such that a positive fit can be created when placing the holding element into the receptacle. The bearing section preferably has an approximate rotation-symmetric shape and preferred the approximate shape of a truncated cone. The matching recess in the receptacle is then preferred approximately trapezoidal in the area of the first section and approximately in the shape of a circle segment in the area of the second section, such that the portion of the bearing section that rests on the second section forms a positive fit with the second section.

By arranging or placing the bearing section in the recess, it is possible to bring the pivot axis of the pivot lever that is to be received to the level of the angle between the two sections of the receptacle. The pivot axis can be located in particular in the plane of the second section.

BRIEF DESCRIPTION OF THE DRAWINGS

The invention will be described in greater detail based on the exemplary embodiments shown in FIGS. 1A to 4B.

FIGS. 1A and 1B show perspective views of a holding element according to the invention;

FIGS. 2A and 2B show perspective views of an additional embodiment of a holding element according to the invention;

FIGS. 3A and 3B show perspective views of a bearing device according to the invention with the holding element shown in FIGS. 1A and 1B; and FIGS. 4A and 4B show perspective views of a bearing device according to the embodiment of the invention with the holding element shown in FIGS. 2A and 2B.

DETAILED DESCRIPTION OF THE PREFERRED EMBODIMENTS

In the example, the holding element 1 shown in FIGS. 1A and 1B is designed as a wing nut with the connecting surfaces 1b, which in the shown example extend at both sides of a bearing section 1a. The bearing section 1a shown in the drawing is designed as a rotation-symmetric element, essentially in the shape of a truncated cone, but can also have different shapes, as shown in FIG. 2A, for example. Non-symmetrical shapes are possible as well. Basically, the bearing section 1a is used for receiving a bearing bolt, which in the shown example is screwed into a threaded receptacle 1c provided in the interior of the bearing section 1a but can also be received by the bearing section in another manner. Preferably, the pivot axis A of the pivot lever (not shown) runs through the receptacle 1c of the bearing section 1, whereupon said pivot lever is to be received. Preferably, the pivot axis A and the symmetry axis of the bearing section 1a coincide. 1d designates an area of the bearing section 1a that is provided for placing onto or resting on the receptacle.

FIGS. 2A and 2B show an additional embodiment of the holding element wherein similar components and sections of the version shown in FIGS. 1A and 1B are identified by a "'". In contrast to the previous embodiment, the holding element 1' is designed as a wing bolt, and differs from the version shown in FIGS. 1A and 1B only through the presence of a bearing bolt 1c', which is used for receiving a pivot lever (not shown).

Other than that, sections 1a', 1b' and 1d' have the same function as parts 1a, 1b, 1d in FIGS. 1A and 1B, so that reference is made to the embodiment above to avoid repetition.

FIGS. 3A and 3B or 4A and 4B, respectively, show the bearing arrangement according to the invention with both embodiments being discussed together below. As is visible in particular in FIGS. 3A and 4A, a receptacle 2 is provided, which in the example shown is designed as a C-profile rail, like the ones used in particular as longitudinal adjustment rails for motor vehicle seats. Other profiles are also conceivable; important for the invention is only that the receptacle has two sections that are at an angle to each other, namely a first section 2a and a section 2b (which preferably is directly adjacent to the first section). Receptacle 2 exhibits a recess 2c that extends across a portion of the first section 2a and the second section 2b.

The recess is adapted to the holding element 1, 1' such that the bearing section that is located between the wings 1b or 1b', respectively, can be placed into the recess and at least parts of the surfaces (3, 3') of the wings 1b, 1b' contact the inner side (4) of the second section 2b. The inner side of the receptacle 2 is shown in FIGS. 3B and 4B, where the inner sides of the first section 2a and the second section 2b can be seen as well. In contrast, FIGS. 3A and 4A show the respective outer sides of sections 2a and 2b. In the shown example, the pivot axis A is approximately parallel to the outer side of the second section 2b. The pivot axis runs preferably through the angle section between the first section 2a and the second section 2b.

Preferably at least one wing 1b, 1b' serving as a connecting surface is connected to the second section 2b of the receptacle 2, preferably by riveting or welding. The bearing section 1a, 1a', which is raised relative to the wing surface, finds room in the recess 2c, 2c' of the receptacle; preferably a positive fit is created here, whereby the area 1d, which in this case has the shape of an arc, can, but does not have to, rest on the narrow side of the recess in the area of the first section 2a. Connections such as weld joints or the like can be provided at other locations as well.

According to the invention, the holding element 1, 1' can be placed in the recess 2c, 2c' of the receptacle 2 from the inner side of the receptacle 2 or of a respective profile and then positively connected with the same. A bearing bolt, which in the example of FIGS. 4A, 4B is already an integral part of the holding element 1', and in the one in FIG. 3A or 3B is inserted by being screwed into the receptacle 1c, can then be populated with a pivot lever (not shown) whose position is facing the outer side of the first section 2a of the receptacle 2.

In this manner, the pivoting support of a lever can be realized easily and with few components, whereby the inner mounting of the holding element 1, 1' on the inner side of the receptacle 2 saves installation space and eliminates the need for external adapters. Preferably, both wing nuts 1 and wing bolts can be provided with identical or similar shapes, such that only one kind of receiving profile with the same recess recess 2c, 2c' must be provided, thus increasing the flexibility of the assembly.

Accordingly, the invention features a bearing device for supporting a pivot lever. The bearing device comprises a receptacle extending in a longitudinal direction and having at least a first section and a second section, wherein the at least first and second sections are arranged at an angle relative to one another and define an inner region which is formed between an inner side of the first section and an inner side of the second section. The receptacle includes a recess formed in the first and second sections, wherein the recess includes a first portion and a second portion. The first portion of the recess is located in the first section of the receptacle and the second portion of the recess is located in the second section of the receptacle. The first and second portions of the recess are connected to one another so as to form the recess with a continuous perimeter.

A holding element having a bearing section is disposed about a pivot axis. The pivot axis extends substantially perpendicular to the longitudinal direction of the receptacle. The bearing section includes a pivot lever receiving element. The holding element includes a wing section extending substantially perpendicular to the pivot axis and includes a connecting surface. The holding element is disposed in the inner region of the receptacle and disposed in the recess of the receptacle such that the bearing section of the holding element is disposed in the first portion of the recess that is formed in the first section of the receptacle. The connecting surface of said holding element is attached to the inner side of the second section.

Modifications and substitutions by one of ordinary skill in the art are considered to be within the scope of the present invention which is not to be limited except by the allowed claims and their legal equivalents.

The invention claimed is:

1. A bearing device for supporting a pivot lever, said bearing device comprising:
   a receptacle (2) having at least a first section (2a) and a second section (2b), wherein said at least first and second sections (2a, 2b) are arranged at an angle relative to one another and define an inner region which is formed between an inner side of the first section (2a) and an inner side (4) of the second section (2b), wherein the receptacle (2) includes a recess (2c, 2c') formed in said first and second sections (2a, 2b), wherein said recess (2c, 2c') includes a first portion and a second portion, wherein the first portion of said recess (2c, 2c') is located in the first section (2a) of the receptacle (2) and the second portion of the recess (2c, 2c') is located in the second section (2b) of the receptacle (2), wherein the first and second portions of the recess (2c, 2c') are connected to one another so as to form the recess with a continuous perimeter, and wherein said receptacle (2) extends in a longitudinal direction; and
   a holding element (1, 1') having a bearing section (1a, 1a') disposed about a pivot axis (A), said pivot axis (a) extending substantially perpendicular to said longitudinal direction of said receptacle (2), said bearing section (1a, 1a') including a pivot lever receiving element (1c, 1c'), said holding element (1, 1') including a wing section (1b, 1b') extending substantially perpendicular to said pivot axis (A), said wing section (1b, 1b') including a connecting surface (3, 3'), said holding element (1, 1') disposed in said inner region of said receptacle (2) and disposed in said recess (2c, 2c') of said receptacle (2) such that said bearing section (1a, 1a') of said holding element (1, 1') is disposed in said first portion of said recess (2c, 2c') that is formed in said first section (2a) of said receptacle (2), and wherein the connecting surface (3, 3') of said holding element (1, 1') is attached to the inner side (4) of said second section (2b).

2. The bearing device as set forth in claim 1, characterized in that a shape of at least a portion of the bearing section (1a, 1a') corresponds to a shape of said first portion of the recess (2c, 2c c') that is disposed in said first section (2a) of said receptacle (2), such that a positive engagement can be established between the holding element (1, 1') and the recess (2c, 2c') when the bearing section (1a, 1a') engages with a portion of said continuous perimeter of the recess (2c, 2c').

3. The bearing device as set forth in claim 1, characterized in that the receptacle (2) is a longitudinal adjustment rail formed by said first section (2a), said second section (2b) and a third section (2d), wherein said first and second sections (2a, 2b) are coupled to one another and are arranged at an angle relative to one another and wherein said third and second sections (2d, 2b) are coupled to one another and are arranged at an angle relative to one another, and wherein said first section (2a) and said third section (2d) are arranged substantially parallel to one another.

4. The bearing device as set forth in claim 1, characterized in that the pivot lever receiving element (1c, 1c') comprises one element selected from a group of elements consisting of a bearing bolt (1c') and a recess (1c).

5. The bearing device as set forth in claim 1, characterized in that the holding element (1, 1') is selected from a group of holding elements consisting of a wing nut (1) and a bolt with wing head (1').

6. The bearing device as set forth in claim 1, characterized in that the connecting surface (3, 3') of said holding element (1, 1') is permanently attached to the receptacle (2).

7. The bearing device as set forth in claim 1, characterized in that the bearing section (1a, 1a') is in a shape of a truncated cone and wherein the recess (2c, 2c') is adapted to mate with this truncated cone shape.

8. The bearing device as set forth in claim 7, characterized in that the recess (2c, 2c') has a substantially trapezoidal shape in the second section (2b) and a substantially semi-circular shape in the first section (2a).

9. A bearing device for supporting a pivot lever, said bearing device comprising:
a receptacle (2) configured as a longitudinal adjustment rail formed by a first section (2a), a second section (2b) and a third section (2d), wherein said first and second sections (2a, 2b) are coupled to one another and are arranged at an angle relative to one another and wherein said third and second sections (2d, 2b) are coupled to one another and are arranged at an angle relative to one another, wherein said first, second and third sections (2a, 2b, 2d) define an inner region which is formed between an inner side of the first section (2a) and an inner side of the second section (2b), wherein the receptacle (2) includes a recess (2c, 2c') formed in said first and second sections (2a, 2b), wherein said recess (2c, 2c') includes a first portion and a second portion, wherein the first portion of said recess (2c, 2c') is located in the first section (2a) of the receptacle (2) and the second portion of the recess (2c, 2c') is located in the second section (2b) of the receptacle (2), wherein the first and second portions of the recess (2c, 2c') are connected to one another so as to form the recess with a continuous perimeter, and wherein said receptacle (2) extends in a longitudinal direction, and wherein the recess (2c, 2c') has a substantially trapezoidal shape in the second section (2b) and a substantially semi-circular shape in the first section (2a); and
a holding element (1, 1') having a bearing section (1a, 1a') disposed about a pivot axis (A), said pivot axis (a) extending substantially perpendicular to said longitudinal direction of said receptacle (2), said bearing section (1a, 1a') including a pivot lever receiving element (1c, 1c'), said holding element (1, 1') including a wing section (1b, 1b') extending substantially perpendicular to said pivot axis (A), said wing section (1b, 1b') including a connecting surface (3, 3'), said holding element (1, 1') disposed in said inner region of said receptacle (2) and disposed in said recess (2c, 2c') of said receptacle (2) such that said bearing section (1a, 1a') of said holding element (1, 1') is disposed in said first portion of said recess (2c, 2c') that is formed in said first section (2a) of said receptacle (2), and wherein the connecting surface (3, 3') of said holding element (1, 1') is attached to the inner side (4) of said second section (2b), wherein the pivot lever receiving element (1c, 1c') comprises one element selected from a group of elements consisting of a bearing bolt (1c') and a recess (1c), and wherein said holding element (1, 1') is selected from a group of holding elements consisting of a wing nut (1) and a bolt with wing head (1').

10. A bearing device for supporting a pivot lever, said bearing device comprising:
a receptacle (2) having at least a first section (2a) and a second section (2b), wherein said at least first and second sections (2a, 2b) are arranged at an angle relative to one another and define an inner region which is formed between an inner side of the first section (2a) and an inner side of the second section (2b), wherein the receptacle (2) includes a recess (2c, 2c') formed in said first and second sections (2a, 2b), wherein said recess (2c, 2c') includes a first portion and a second portion, wherein the first portion of said recess (2c, 2c') is located in the first section (2a) of the receptacle (2) and the second portion of the recess (2c, 2c') is located in the second section (2b) of the receptacle (2), wherein the first and second portions of the recess (2c, 2c') are connected to one another so as to form the recess with a continuous perimeter, and wherein said receptacle (2) extends in a longitudinal direction, and wherein the recess (2c, 2c') has a substantially trapezoidal shape in the second section (2b) and a substantially semi-circular shape in the first section (2a); and
a holding element (1, 1') having a bearing section (1a, 1a') disposed about said pivot axis (A), said pivot axis (a) extending substantially perpendicular to said longitudinal direction of said receptacle (2), said bearing section (1a, 1a') including a pivot lever receiving element (1c, 1c'), said holding element (1, 1') including a wing section (1b, 1b') extending substantially perpendicular to said pivot axis (A), said wing section (1b, 1b') including a connecting surface (3, 3'), said holding element (1, 1') disposed in said inner region of said receptacle (2) and disposed in said recess (2c, 2c') of said receptacle (2) such that said bearing section (1a, 1a') of said holding element (1, 1') is disposed in said first portion of said recess (2c, 2c') that is formed in said first section (2a) of said receptacle (2), and wherein the connecting surface (3, 3') of said holding element (1, 1') is attached to the inner side (4) of said second section (2b).

11. A bearing device for supporting a pivot lever, said bearing device comprising:
a receptacle (2) having at least a first section (2a) and a second section (2b), wherein said at least first and second sections (2a, 2b) are arranged at an angle relative to one another and define an inner region which is formed between an inner side of the first section (2a) and an inner side (4) of the second section (2b), wherein the receptacle (2) includes a recess (2c, 2c') formed in said first and second sections (2a, 2b), wherein said recess (2c, 2c') includes a first portion and a second portion, wherein the first portion of said recess (2c, 2c') is located in the first section (2a) of the receptacle (2) and the second portion of the recess (2c, 2c') is located in the second section (2b) of the receptacle (2), wherein the first and second portions of the recess (2c, 2c') are connected to one another so as to form the recess with a continuous perimeter, and wherein said receptacle (2) extends in a longitudinal direction; and a holding element (1, 1') having a bearing section (1a, 1a') disposed about a pivot axis (A), said pivot axis (a) extending substantially perpendicular to said longitudinal direction of said receptacle (2), said bearing section (1a, 1a') including a pivot lever receiving element (1c, 1c'), said holding element (1, 1') including a wing section (1b, 1b') extending substantially perpendicular to said pivot axis (A), said wing section (1b, 1b') including a connecting surface (3, 3'), said holding element (1, 1') disposed in said inner region of said receptacle (2) and disposed in said recess (2c, 2c') of said receptacle (2) such that said bearing section (1a, 1a') of said holding element (1, 1') is disposed in said first portion of said recess (2c, 2c') that is formed in said first section (2a) of said receptacle (2), and wherein the connecting surface (3, 3') of said holding element (1, 1') is attached to the inner side (4) of said second section (2b), wherein said holding element (1, 1') is selected from a group of holding elements consisting of a wing nut (1) and a bolt with wing head (1').

* * * * *